(12) United States Patent
Fox, III

(10) Patent No.: US 10,292,534 B2
(45) Date of Patent: May 21, 2019

(54) FOOD CONTAINER ASSEMBLY

(71) Applicant: Frederick Fox, III, Allston, MA (US)

(72) Inventor: Frederick Fox, III, Allston, MA (US)

(*) Notice: Subject to any disclaimer, the term of this patent is extended or adjusted under 35 U.S.C. 154(b) by 95 days.

(21) Appl. No.: 15/404,642

(22) Filed: Jan. 12, 2017

(65) Prior Publication Data
US 2018/0192827 A1 Jul. 12, 2018

(51) Int. Cl.
B65D 1/22 (2006.01)
A47J 47/10 (2006.01)
B65D 43/02 (2006.01)
B65D 81/26 (2006.01)
B65D 25/02 (2006.01)

(52) U.S. Cl.
CPC .............. A47J 47/10 (2013.01); B65D 43/02 (2013.01); B65D 25/02 (2013.01); B65D 81/261 (2013.01)

(58) Field of Classification Search
CPC .. A47J 47/10; A47J 43/00; A47J 36/20; A47J 27/04; A47J 27/18; B65D 25/02; B65D 25/04; B65D 43/02; B65D 81/261; B65D 1/24; B65D 81/32; B65D 21/0233; B65D 2205/02
USPC ...... 220/23.83, 23.87, 23.89, 501, 528, 529, 220/573.4, 785; 99/410, 413; 210/498
See application file for complete search history.

(56) References Cited

U.S. PATENT DOCUMENTS

| 4,206,845 | A | 6/1980 | Christian |
| 4,341,324 | A | 7/1982 | Ramirez |
| 5,605,231 | A | 2/1997 | Borsboom et al. |
| 7,147,826 | B2* | 12/2006 | Haywood ............... B01L 3/502 422/547 |
| D641,217 | S | 7/2011 | Chen et al. |
| 2004/0200845 | A1* | 10/2004 | Watzke .................... B65D 1/24 220/501 |
| 2005/0205487 | A1 | 9/2005 | Rogers |
| 2010/0320210 | A1 | 12/2010 | Cimmerer et al. |
| 2013/0056369 | A1 | 3/2013 | Jorgensen |

* cited by examiner

Primary Examiner — Fenn C Mathew
Assistant Examiner — Elizabeth J Volz

(57) ABSTRACT

A food container assembly includes a housing with a bottom wall and a perimeter wall that is attached to and extends upwardly therefrom. The perimeter wall has an upper edge defining an access opening into the housing. A shoulder is attached to an inner surface of the perimeter wall and extends continuously around an interior of the housing. The shoulder is spaced from the upper edge. A food holder is removably positioned in the housing and comprises a mesh material such that fluids may flow through the food holder. The food holder has an outer ridge that releasably engages the shoulder to support the food holder on the shoulder so that the food holder is spaced from the bottom wall.

5 Claims, 3 Drawing Sheets

FOOD CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98.

The disclosure and prior art relates to food storage and draining devices and more particularly pertains to a new food storage and draining device for holding food while allowing the fluids in the food to drain away.

BRIEF SUMMARY OF THE INVENTION

An embodiment of the disclosure meets the needs presented above by generally comprising a housing including a bottom wall and a perimeter wall that is attached to and extends upwardly therefrom. The perimeter wall has an upper edge defining an access opening into the housing. A shoulder is attached to an inner surface of the perimeter wall and extends continuously around an interior of the housing. The shoulder is spaced from the upper edge. A food holder is removably positioned in the housing and comprises a mesh material such that fluids may flow through the food holder. The food holder has an outer ridge that releasably engages the shoulder to support the food holder on the shoulder so that the food holder is spaced from the bottom wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
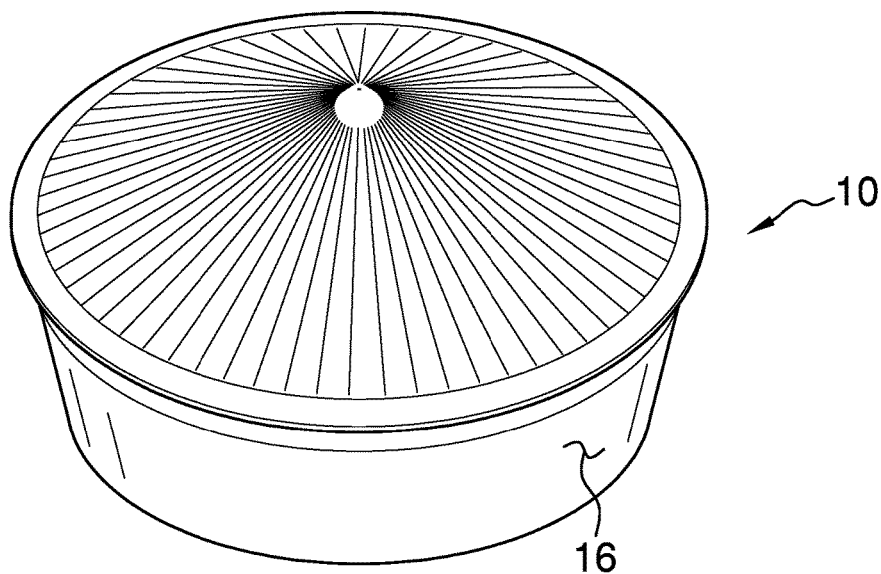
FIG. 1 is a top perspective view of a food container assembly according to an embodiment of the disclosure.
Figure 2:
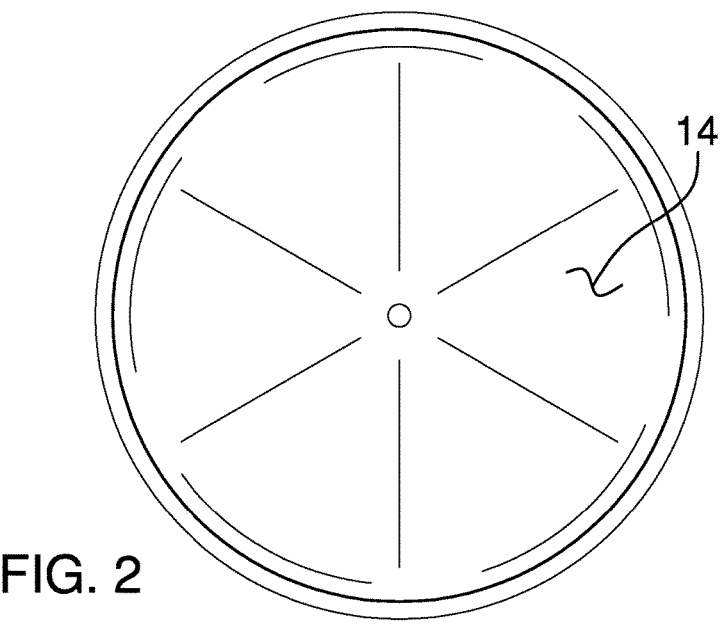
FIG. 2 is a bottom view of an embodiment of the disclosure.
Figure 3:
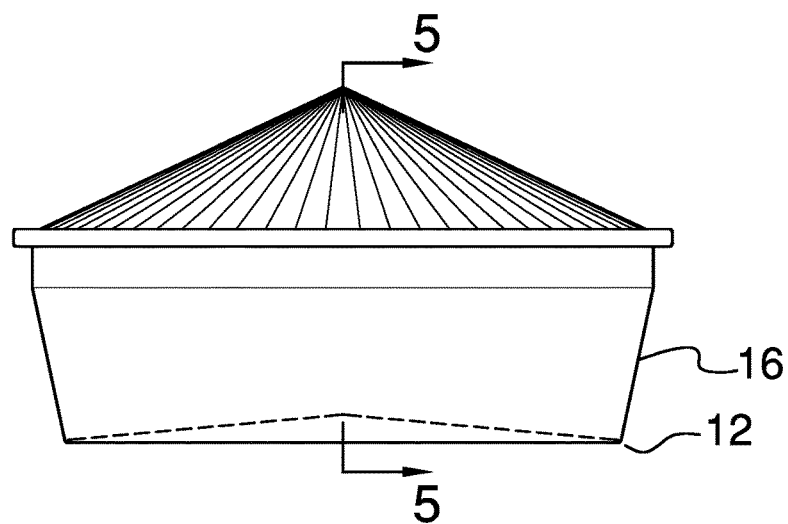
FIG. 3 is a side view of an embodiment of the disclosure.
Figure 4:
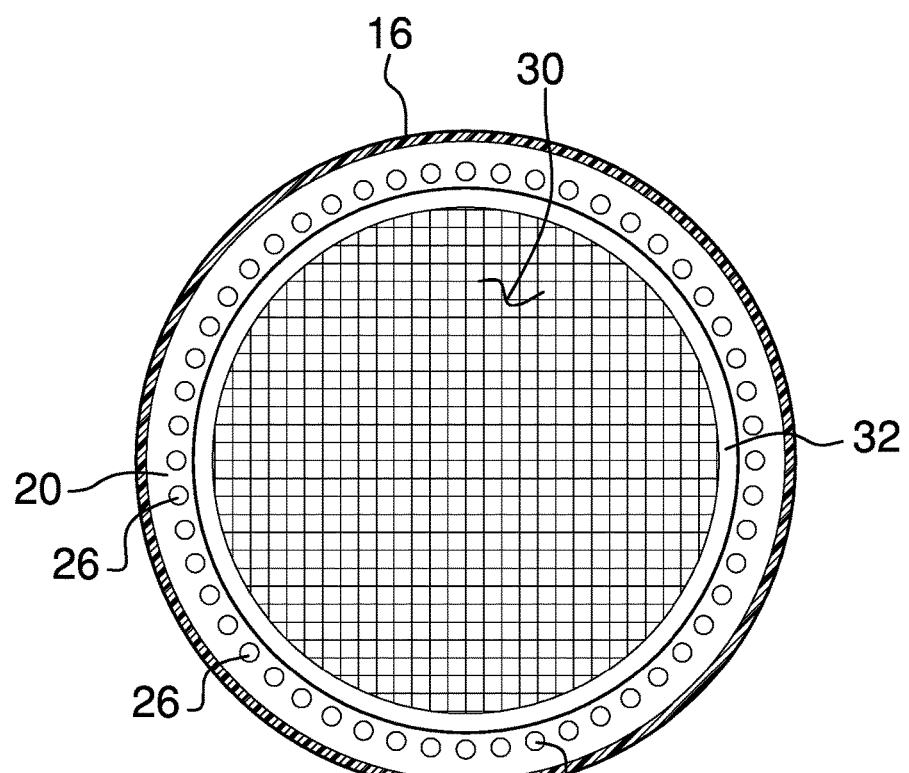
FIG. 4 is a cross-sectional view of an embodiment of the disclosure taken along line 4-4 of FIG. 3.
Figure 5:
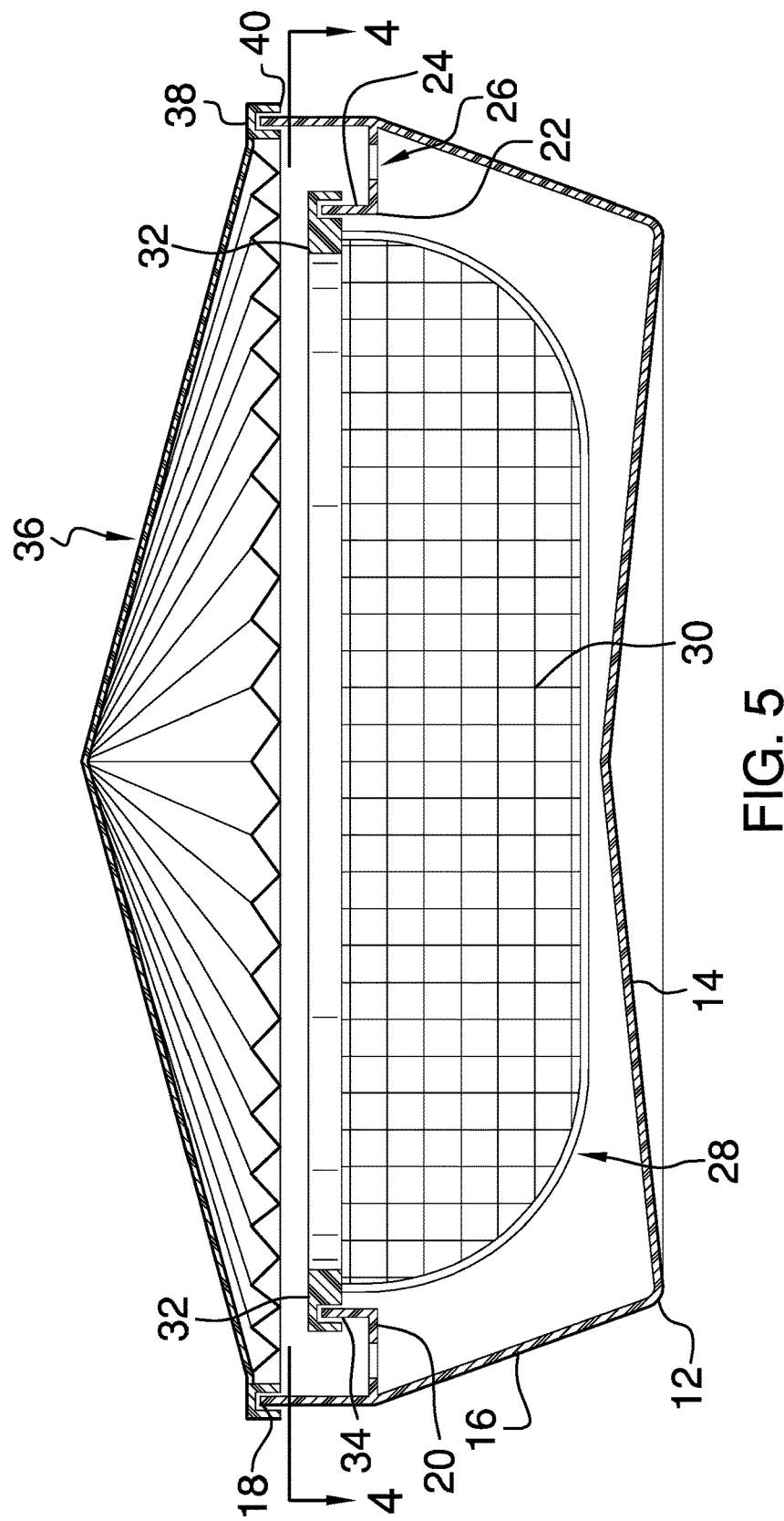
FIG. 5 is a cross-sectional view of an embodiment of the disclosure taken along line 5-5 of FIG. 4.

With reference now to the drawings, and in particular to FIGS. 1 through 5 thereof, a new food storage and draining device embodying the principles and concepts of an embodiment of the disclosure and generally designated by the reference numeral 10 will be described.

As best illustrated in FIGS. 1 through 5, the food container assembly 10 generally comprises a housing 12 including a bottom wall 14 and a perimeter wall 16 that is attached to and extends upwardly from the bottom wall 14. The perimeter wall 16 has an upper edge 18 defining an access opening into the housing 12. The perimeter wall 16 tapers outwardly from the bottom wall 14. The bottom wall 14 has a conical shape such that the bottom wall 14 is angled upwardly from the perimeter wall to a central position of the bottom wall 14.

A shoulder 20 is attached to an inner surface of the perimeter wall 16 and extends continuously around an interior of the housing 12. The shoulder 20 is spaced from the upper edge 18. The shoulder 20 has an inner edge 22 and an upwardly extending flange 24 is attached to and is co-extensive with the inner edge 22. The shoulder 20 has a plurality of openings 26 extending therethrough to allow fluid to flow through the shoulder 20.

A food holder 28 is bowl shaped and is removably positioned in the housing 12. The food holder 28 comprises a mesh material 30, or otherwise perforated material, such that fluids may flow through the food holder 28. The food holder 28 has an outer ridge 32 extending around the food holder 28. The outer ridge 32 releasably engages the shoulder 20 such that the food holder 28 is supported on the shoulder 20 and spaced from the bottom wall 14. The outer ridge 32 has a trough 34 extending upwardly therein. The trough 34 receives the flange 24.

A cover 36 is removably positioned on the housing 12 to close the access opening. The cover 36 includes a perimeter coupler 38. The perimeter coupler 38 releasably engages the upper edge 18 of the perimeter wall 16. The perimeter coupler 38 may include a slot 40 for receiving the upper edge 18. The perimeter coupler 38 may be configured to form a seal with the perimeter wall 16. The cover 36 may be conically shaped so that the cover 36 of one assembly 10 will fit into the bottom wall 14 of another one of the assemblies 10. Additionally, the cover 36 may be pleated as is clearly seen in FIGS. 1 and 5. The pleats and shape of the cover 36 cause condensation, from hot food, to coalesce and run down the underside of the cover 36 to the perimeter wall 16 so that fluid can fall onto the shoulder 20 and flow through the openings 26.

In use, food products, such as hot foods being stored for later consumption, are positioned in the food holder 28 with the food holder 28 placed in the housing 12. The food holder 28 allows liquids to drain onto the bottom wall 14 to prevent the food products from retaining condensed fluids that will make the food products soggy and unappetizing. The shape of the bottom wall 14 and the perimeter wall 16 inhibit the fluids from being agitated to prevent the fluid from splashing upwardly back into contact with the food product.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food container assembly configured for holding and storing food, said assembly comprising:
   a housing including a bottom wall and a perimeter wall being attached to and extending upwardly therefrom, said perimeter wall having an upper edge defining an access opening into said housing;
   a shoulder being attached to an inner surface of said perimeter wall and extending continuously around an interior of said housing, said shoulder being spaced from said upper edge, said shoulder having an inner edge, an upwardly extending flange being attached to and being co-extensive with said inner edge, said shoulder having a plurality of openings extending therethrough; and
   a food holder being removably positioned in said housing, said food holder comprising a mesh material such that fluids may flow through said food holder, said food holder having an outer ridge, said outer ridge releasably engaging said shoulder such that said food holder is supported on said shoulder and spaced from said bottom wall.

2. The food container assembly configured for holding and storing food according to claim 1, wherein said perimeter wall tapers outwardly from said bottom wall.

3. The food container assembly configured for holding and storing food according to claim 1, wherein said bottom wall has a conical shape such that said bottom wall is angled upwardly from said perimeter wall to a central position of said bottom wall.

4. The food container assembly configured for holding and storing food according to claim 1, further including a cover being removably positioned on said housing to close said access opening, said cover including a perimeter coupler, said perimeter coupler releasably engaging said upper edge of said perimeter wall.

5. A food container assembly configured for holding and storing food, said assembly comprising:
   a housing including a bottom wall and a perimeter wall being attached to and extending upwardly therefrom, said perimeter wall having an upper edge defining an access opening into said housing, said perimeter wall tapering outwardly from said bottom wall, said bottom wall having a conical shape such that said bottom wall is angled upwardly from said perimeter wall to a central position of said bottom wall;
   a shoulder being attached to an inner surface of said perimeter wall and extending continuously around an interior of said housing, said shoulder being spaced from said upper edge, said shoulder having an inner edge, an upwardly extending flange being attached to and being co-extensive with said inner edge, said shoulder having a plurality of openings extending therethrough;
   a food holder being removably positioned in said housing, said food holder comprising a mesh material such that fluids may flow through said food holder, said food holder having an outer ridge, said outer ridge releasably engaging said shoulder such that said food holder is supported on said shoulder and spaced from said bottom wall; and
   a cover being removably positioned on said housing to close said access opening, said cover including a perimeter coupler, said perimeter coupler releasably engaging said upper edge of said perimeter wall.

\* \* \* \* \*